United States Patent
Zölfl et al.

(10) Patent No.: US 8,985,453 B2
(45) Date of Patent: Mar. 24, 2015

(54) CHANGE PART WITH IDENTIFICATION ELEMENT

(71) Applicant: Krones AG, Neutraubling (DE)

(72) Inventors: Markus Zölfl, Metten (DE); Timo Pronold, Regensburg (DE); Stefan Raith, Pfatter (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 14/019,582

(22) Filed: Sep. 6, 2013

(65) Prior Publication Data
US 2014/0061313 A1 Mar. 6, 2014

(30) Foreign Application Priority Data
Sep. 6, 2012 (DE) .......... 10 2012 215 789

(51) Int. Cl.
  G06F 17/00 (2006.01)
  G06K 7/08 (2006.01)
  G06K 19/06 (2006.01)
  G06K 19/02 (2006.01)
  B65C 9/40 (2006.01)
  B67C 3/00 (2006.01)
  B65C 9/00 (2006.01)

(52) U.S. Cl.
  CPC . G06K 19/02 (2013.01); B65C 9/40 (2013.01); B67C 3/007 (2013.01); B65C 9/0062 (2013.01)
  USPC ............ 235/451; 235/375; 235/487; 235/492

(58) Field of Classification Search
  USPC .......... 235/375, 451, 492, 487; 340/5.8, 10.1, 340/10.2, 10.51, 572.1, 572.2
  See application file for complete search history.

(56) References Cited

U.S. PATENT DOCUMENTS

| | | | |
|---|---|---|---|
| 2002/0121966 A1* | 9/2002 | Woodard et al. | 340/384.6 |
| 2004/0119599 A1* | 6/2004 | Stevenson et al. | 340/686.1 |
| 2006/0164291 A1* | 7/2006 | Gunnarsson | 342/51 |
| 2007/0285244 A1* | 12/2007 | Tucker et al. | 340/572.1 |
| 2009/0303013 A1* | 12/2009 | Edgerton | 340/10.1 |
| 2010/0079238 A1* | 4/2010 | Gravelle et al. | 340/5.8 |
| 2010/0283593 A1* | 11/2010 | Miller et al. | 340/447 |
| 2011/0088693 A1* | 4/2011 | Somervell et al. | 128/203.14 |

FOREIGN PATENT DOCUMENTS

| | | |
|---|---|---|
| DE | 19941485 A1 | 10/2000 |
| DE | 10060581 A1 | 6/2002 |
| DE | 102005059312 A1 | 6/2007 |
| DE | 102007025521 A1 | 12/2008 |

(Continued)

OTHER PUBLICATIONS

Search report for EP 13 17 9904, dated Jan. 20, 2014.

(Continued)

Primary Examiner — Tuyen K Vo
(74) Attorney, Agent, or Firm — Marshall, Gerstein & Borun LLP

(57) ABSTRACT

A change part, which is used for a machine employed in the filling or bottle manufacturing industry and which includes an identification element, where the identification element comprises a piezoelectric transmitter, which, when the change part is mounted and/or demounted, is able to be activated by the forces acting thereon and to transmit an identification signal, and to a suitable method for identifying a change part mounted in a machine.

14 Claims, 3 Drawing Sheets

(56) References Cited

FOREIGN PATENT DOCUMENTS

| | | |
|---|---|---|
| DE | 102009058087 A1 | 6/2011 |
| DE | 102011116192 A1 | 4/2012 |
| DE | 102010053772 A1 | 6/2012 |
| EP | 1384123 A1 | 1/2004 |
| EP | 2332846 A1 | 6/2011 |

OTHER PUBLICATIONS

Signal Conditioning Piezoelectric Sensors, James Karki, Texas Instruments, Sep. 2000, XP002718412, URL: http://www.ti.com/lit/an/sloa033a/sloa033a.pdf.

Search Report for German Application No. 10 2012 215 789.1, dated Feb. 7, 2013.

* cited by examiner

CHANGE PART WITH IDENTIFICATION ELEMENT

CROSS-REFERENCE TO RELATED APPLICATION

The present application claims the benefit of priority of German Application No. 10 2012 215 789.1, filed Sep. 6, 2013. The entire text of the priority application is incorporated herein by reference in its entirety.

FIELD OF THE DISCLOSURE

The present disclosure relates to a change part, which is used for a machine employed in the filling or bottle manufacturing industry and which includes an identification element, and to a suitable method.

BACKGROUND

The prior art already discloses various change parts with identification elements allowing the change part to be identified by a suitable reader.

DE 10 060 581 A1, by way of example, shows a conveyor system for conveying objects, which is provided with a transmitter capable of accessing individual transceivers. In the case of high power consumption or long service lives an additional energy storage unit and a generator may be provided, which can withdraw energy from the surroundings. This energy may be withdrawn e.g. from the surrounding heat, light or mechanical energy.

In addition, EP 13 84 123 B1 shows a transport facility for items. Sensors are here provided for determining the transporter loading, said sensors including a signal transmitting unit which makes additional wiring with the control module superfluous, i.e. which is able to transmit signals by wireless transmission. The sensors are equipped with batteries or rechargeable batteries. Self-generating operation e.g. by means of a generator driven by the conveyor belts is possible as well. Likewise, solar cells may provide the energy required for the sensors.

DE 10 2007 025 521 A1 discloses a conditioning machine for bottles, cans or similar containers, the conditioning machine being equipped with at least one identification element that is assigned to a replaceable part of the machine. This identification element is preferably configured as a self-adhesive identification label that is assigned to a replaceable part of the machine. Possible embodiments that may here be used are e.g. bar codes which can be read with known scanning devices. According to a specially preferred embodiment the identification element is, however, implemented with the aid of a transponder allowing contract-free reading of the identification. This transponder includes in any case an energy storage unit, e.g. an integrated battery and possibly a rechargeable capacitor, which can be charged e.g. during the reading operation by the scanning device.

SUMMARY OF THE DISCLOSURE

It is one aspect of the present disclosure to provide an identification device for a replaceable change part, which is as reliable and as compact as possible and which also allows an unequivocal identification of the change part, in particular when the latter is installed and removed.

The change part according to the present disclosure, which is used for a machine employed in the filling or bottle manufacturing industry and which includes an identification element, employs an identification element which comprises a piezoelectric transmitter, which, when the change part is mounted and demounted, is able to be activated by the forces acting thereon and to transmit an identification signal. The use of piezoelectric transmitters allows, on the basis of a compact structural design, an identification of a replaceable change part, the mode of operation of the piezoelectric transmitter during mounting and/or demounting guaranteeing that the identification signal is transmitted.

According to a further embodiment, the change part employs a piezoelectric transmitter that comprises a piezoelectric crystal capable of providing the energy required for transmitting the identification signal, the piezoelectric crystal consisting e.g. of α-quartz or gallium orthophosphate. These materials exhibit a high reliability and are stable up to 573° C. (and 900° C. for gallium orthophosphate). Hence, these crystals can be used for a great variety of purposes.

According to a further embodiment, the change part includes a protection mechanism which is capable of preventing activation of the piezoelectric transmitter as long as the change part is mounted in the machine. It is thus guaranteed that additional loads on the piezoelectric transmitter are avoided and that the latter will only be active during mounting and demounting. This will increase the surface life of the transmitter.

According to a further embodiment, the change part employs a piezoelectric transmitter which is able to obtain the full amount of energy required for transmitting the identification signal from the mounting and/or demounting of the change part. Additional energy supply units, such as batteries, are thus rendered superfluous.

According to a further embodiment, the change part provides an identification signal can be transmitted by wireless transmission. This is particularly advantageous, since vulnerable cables are thus rendered superfluous and the identification signal can easily be read by the operator.

In addition, the disclosure provides that the identification element of the change part includes an energy storage unit which is able to store partly or fully the energy generated by the piezoelectric transmitter. In the event that the whole amount of energy is stored, transmission of the signal can be delayed. The identification signal can thus also be transmitted at a later time. If only part of the energy generated by the piezoelectric transmitter is stored, a renewed transmission of the identification signal allows to check at a later time, in particular prior to demounting, whether the correct part is demounted.

According to a further embodiment, the change part provides that the identification element includes a delay mechanism which is able to transmit the identification signal at an arbitrary moment in time. This delay is made possible through the energy stored in the energy storage unit. The delay mechanism may, for example, be adjusted such that it does not transmit the signal immediately during mounting and the resultant activation of the piezoelectric transmitter, which would necessitate that an operator uses a suitable reader at the same moment. The embodiment may, however, be so conceived that the delay mechanism transmits the identification signal at a later time, e.g. a few minutes or hours after mounting of the change part. The operator is thus enabled to read the identification information easily and in a convenient manner.

Making use of this change part, a method of identifying by means of an identification element a change part for a machine employed in the filling or bottle manufacturing industry can be realized, the method including that a piezoelectric transmitter is activated, when the change part is mounted to and/or demounted from the machine, by the forces acting thereon and transmits an identification signal. This method allows a very simple and reliable identification of replaceable change parts at respective machines on the part of the operator.

According to one embodiment, the method provides that the identification signal is a change part class-specific signal or a globally unique identifier. Identification signals configured as change part class-specific signals or as globally unique identifiers allow not only reading of an arbitrary identification signature during mounting and/or demounting of a change part but also a component-specific assignment of the signal and facilitate thus the identification of the mounted and/or demounted change parts.

According to a further embodiment, the method provides that the energy required for transmitting the signal is produced by a piezoelectric crystal, e.g. α-quartz or gallium orthophosphate, which converts the energy generated during mounting and/or demounting of the change part. The use of these well-known materials in the piezoelectric transmitter allows use for a great variety of purposes, since especially these materials exhibit a high temperature resistance of up to 573° C. (for α-quartz) and 900° C. (for gallium orthophosphate).

In addition, activation of the piezoelectric crystal can be prevented by a protection mechanism as long as the change part is mounted in the machine. An inadvertent transmission of identification signals is thus suppressed, and the transmission of incorrect identification signals (e.g. during demounting of some other change part) can be prevented.

According to a further embodiment, the method provides that the identification signal is transmitted by wireless transmission. Change parts can thus much more easily be identified by the operator, since identification is no longer bound to a certain place and since a direct connection to the change part is no longer necessary.

According to a further embodiment, the method provides that the energy obtained through the piezoelectric transmitter is stored fully or partly in an energy storage unit. Energy can thus be held available for a transmission of the identification signal at a later time, or, if only part of the energy is stored, energy can be stored, which is required for transmitting an additional identification signal, e.g. immediately prior to demounting the change part.

According to a corresponding embodiment, the method provides that the identification signal is transmitted by means of a delay mechanism, utilizing the energy stored in the energy storage unit, at a moment in time different from the mounting and/or demounting of the change part. The operator is thus no longer compelled to read the identification signal at a moment in time corresponding to the time at which demounting and/or mounting is carried out. This allows reading of the identification signal at a later time, whereby the change part can more easily be changed over.

According to a further embodiment, the method is characterized in that the identification signal is transmitted omnidirectionally. Provided that the signal strength is sufficiently high, this will enable an operator to read the identification signal virtually at any location in the immediate vicinity of the machine into which the change part is mounted and/or from which the change part is demounted.

DETAILED DESCRIPTION OF THE PREFERRED EMBODIMENT

Figure 1:
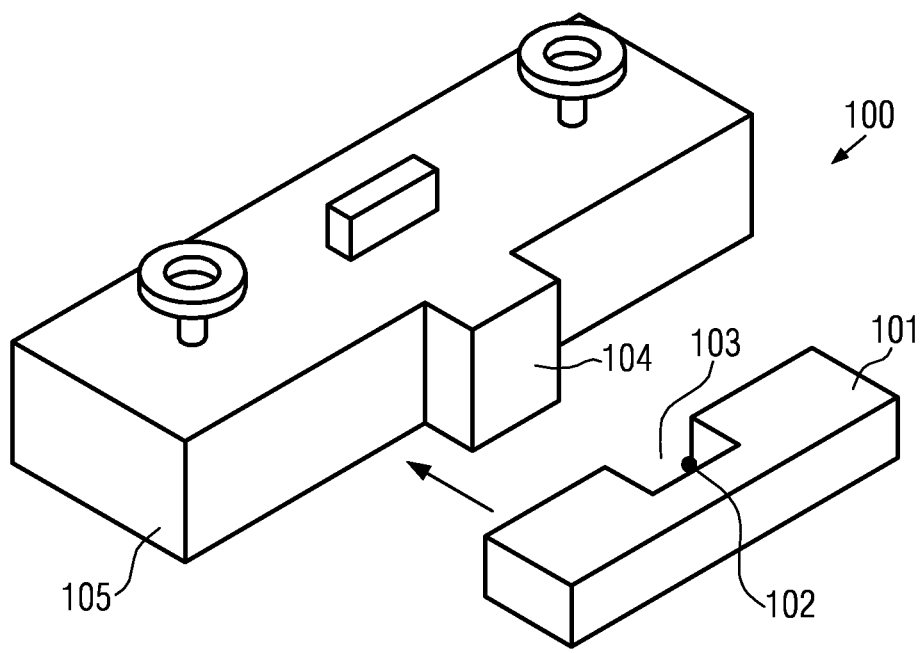
FIG. 1 shows a schematic representation of a change part according to the present disclosure, which is intended to be mounted into a machine.

FIG. 1 shows a device 100 including a change part 101 according to the present disclosure which can be mounted in a respective machine 105. The change part 101 includes at least one recess 103 having the piezoelectric transmitter 102 provided therein. The whole identification element comprises not only the piezoelectric transmitter 102, but it may also comprise additional components which are here not shown. The recess 103 is configured such that it is adapted to be fitted to a complementary protrusion 104 of the device 105 according to the key-lock principle. The machine 105 may be an arbitrary machine, e.g. a machine of the type normally used in the bottle manufacturing industry, such as blow molding machines, labeling machines or the like. Likewise, it may be a conveyor device such as a guide star. The change part 101 may then e.g. be a component part of the transfer device of the guide star or a blow mold. In any case, the piezoelectric transmitter 102 is provided in a recess 103, which is preferably a standardized recess. This has the advantage that the piezoelectric transmitter can be mounted in devices which are already known or that these devices only have to be slightly modified with respect to the protrusions 104 and the recesses 103, respectively. Since standardized change parts are normally used in industry, this does, however, not represent a fundamental problem.

Figure 2A:
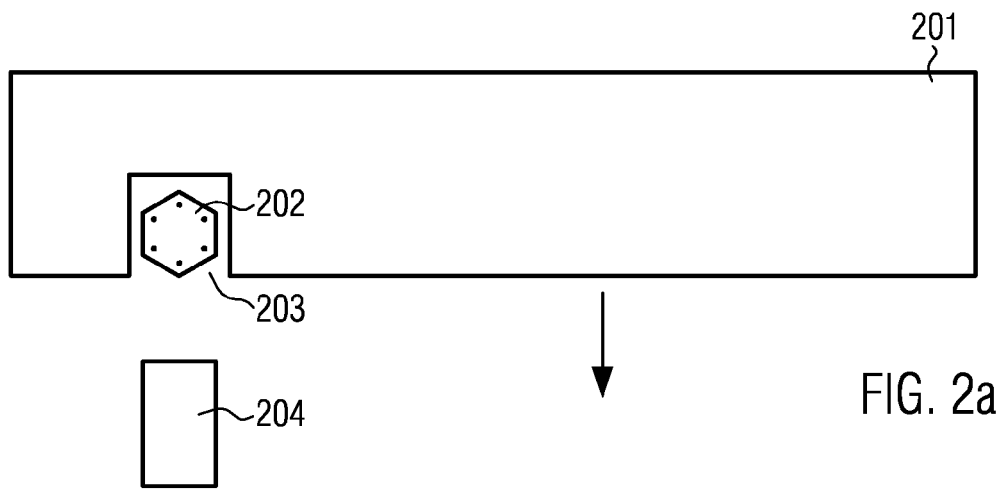
FIGS. 2a to 2c show schematic representations of the mode of operation of the piezoelectric transmitter.
Figure 2B:
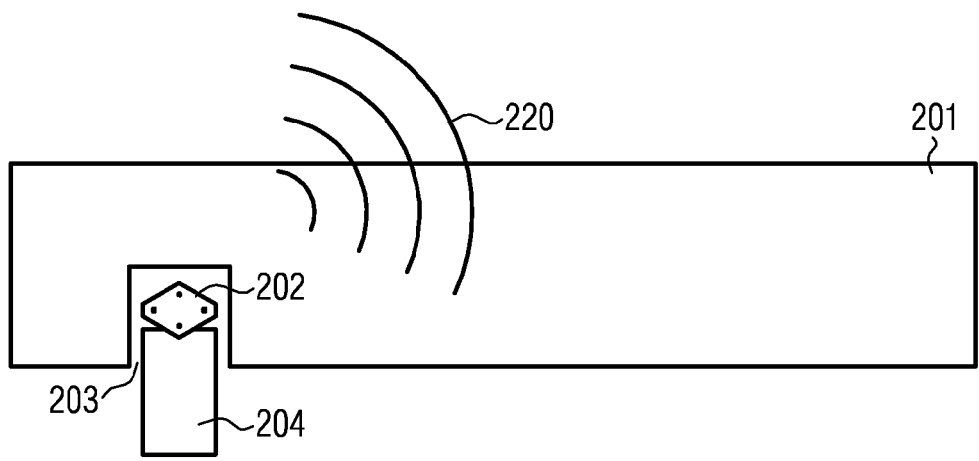
Figure 2C:
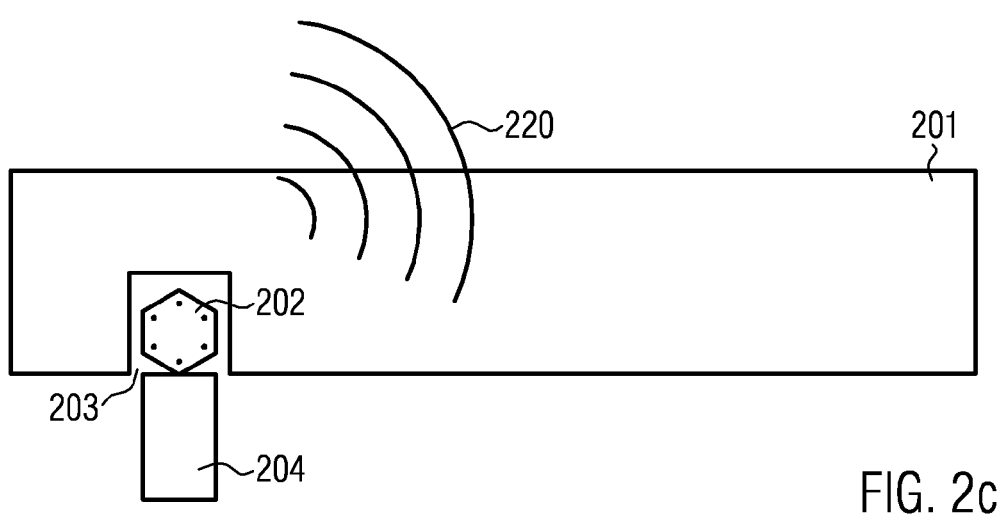

FIG. 2 is a schematic representation showing how a change part 201 is mounted to and demounted from a respective machine. In place of the machine, into which the change part 201 is mounted, the protrusion 204, which is used for fixing the change part 201 to the machine, is here shown. In FIGS. 2a to 2c, the piezoelectric transmitter 202, which is provided in the change part 201, is only schematically shown or rather symbolized by the piezoelectric element (special crystal or special piezoelectric ceramics) included in the transmitter, and, for the sake of improved clarity, it is represented with very large dimensions in relation to the dimensioning of the change part 201. For all cases of use, the piezoelectric transmitter 202 or at least the piezoelectric crystal should preferably be arranged on the side opposite to the opening of the recess 203. This positioning allows, on the one hand, unhindered insertion of the protrusion 204 of the respective machine into the recess 203 of the change part 201 for establishing the connection and guarantees, on the other hand, that the piezoelectric transmitter 202 will only be activated when the change part is mounted or demounted, so as to prevent accidental activation. It goes without saying that it would also be possible to provide the change part 201 with a protrusion and the machine with a complementary recess. It may, however, happen that the piezoelectric transmitter or the piezoelectric crystal, which would then be attached to the protrusion of the change part, is inadvertently activated. If the piezoelectric transmitter is, however, only used as a signaling device for correct mounting and demounting of the change part, it may also be provided in the recess of the machine.

FIG. 2a shows the situation during mounting of the change part 201. The change part 201 is moved in the direction of the arrow shown towards the machine, i.e. the protrusion 204 representing the machine. Preferably, the recess 203 of the change part 201 and the protrusion 204 of the machine, which is here not shown, are designed such that, according to a key-lock principle, they will only fit into one another when occupying a predetermined position so as to avoid constructional defects. By attaching the change part 201 to the machine, the piezoelectric crystal in the piezoelectric transmitter 202 will be deformed, as shown in FIG. 2b. The shape of the piezoelectric crystal 202 changes as long as the movement of the change part 201 relative to the protrusion 204 lasts, beginning with the first contact between the protrusion 204 and the piezoelectric crystal 202 and ending with the final positioning and fixing of the change part.

When the change part has been mounted, the piezoelectric crystal has a shape of the type shown e.g. in FIG. 2b, which differs from the shape shown in FIG. 2a. The deformation of the piezoelectric crystal 202 ensures that a voltage will be created and causes the transmitter to transmit an electric signal 220. When a suitable piezoelectric transmitter or piezoelectric crystal is chosen, a special signal or signal profile can be generated. This fact can be utilized for providing special change parts 201 with special piezoelectric transmitters 202 or piezoelectric crystals which are unique e.g. for each class of change parts or even for each individual change part (globally unique identifier).

FIG. 2c indicates the demounting of the change part from the machine and the protrusion 204, respectively. From the fixed position of the change part 201 shown in FIG. 2b, the change part 201 is now moved in the direction indicated by the arrow, whereby the piezoelectric crystal in the piezoelectric transmitter 202 is deformed once more. Since the piezoelectric effect is temporally reversible, a respective signal 220 is transmitted once more during this deformation of the piezoelectric crystal.

Summarizing it can be said that the utilization of the piezoelectric effect with the aid of a piezoelectric transmitter or piezoelectric crystal allows the energy, which is utilized during mounting of the change part 201 in or during demounting of the change part 201 from the machine, to be partially converted into an electric voltage, which, in turn, can be utilized for transmitting with the aid of a suitable transmitter a signal, in particular an identification signal. Due to the temporal reversibility of the piezoelectric effect, i.e. the same voltage difference is generated in both directions of deformation (mounting and demounting of the crystal), a respective identification signal can be transmitted during mounting as well as during demounting.

Figure 3:
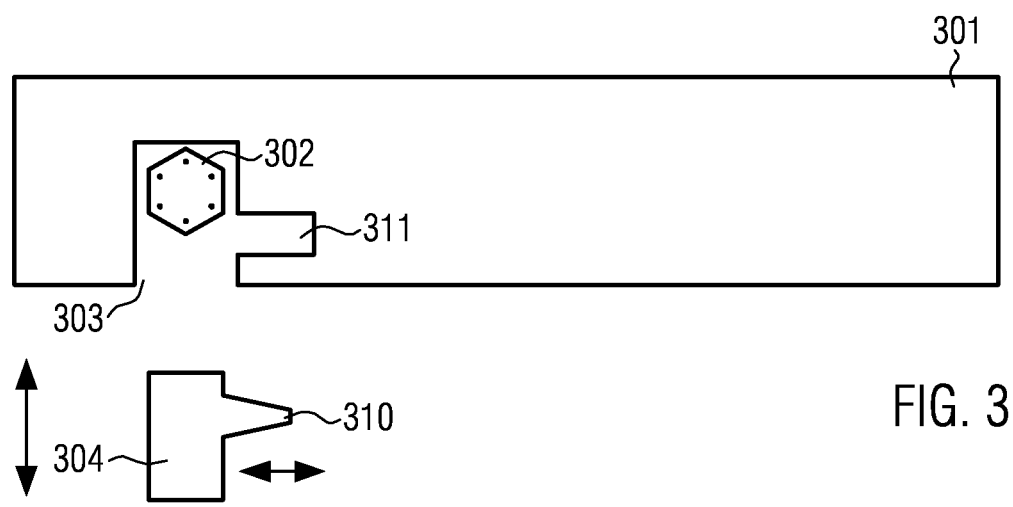
FIG. 3 shows a schematic representation of the protection device.

FIG. 3 shows a protection device 310 exceeding the already described realization of the protrusion 304 and recess 303 and allowing the change part 301 to be arrested as reliably as possible. To this end, the recess 303 of the change part 301 may e.g. include a notch 311. Complementarily thereto, a preferably movable latch 310 is provided on the protrusion 304 of the machine to which the change part 301 is to be fixed. This latch 310 may be beveled so that the protrusion 304 can be inserted more easily. The latch 310 will lockingly engage the notch 311 only if the change part 301 occupies the correct final position. The change part 301 should here preferably be fixed in position such that a deformation of the piezoelectric crystal in the piezoelectric transmitter 302 can no longer occur. Alternatively to the notch 311 and the latch 310 also screw-type connections or other releasable connections, e.g. click connections, may be provided.

Figure 4:
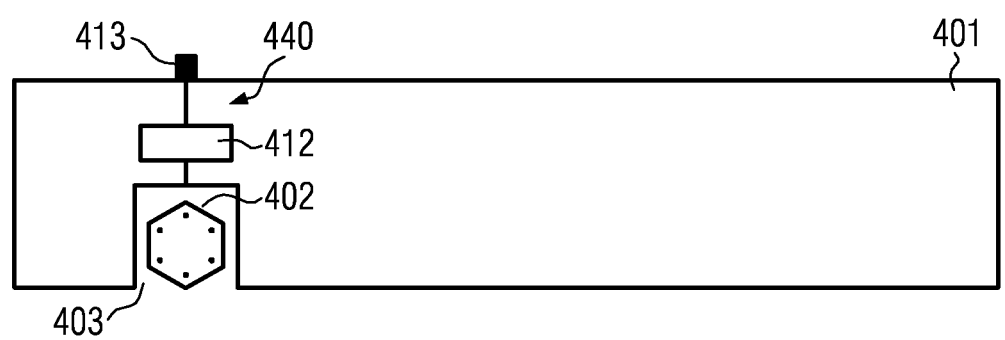
FIG. 4 shows a schematic structural design of the change part including an additional energy storage unit.

FIG. 4 shows a detailed view of the change part 401 and in particular a general view of the piezoelectric transmitter 440. The piezoelectric transmitter 440 comprises the piezoelectric crystal 402, which has already been described in connection with the above figures, and in addition a control unit 412 as well as a transmitter unit 413 that may perhaps be arranged in spaced relationship with the control unit 412. It should here be pointed out that the control unit 412 may comprise e.g. a microprocessor transmitting to the transmitter unit 413 the information, which is required for transmitting the signal, and the necessary commands. The embodiment may be so conceived that the identification signal transmitted through the transmitter unit 413 is not transmitted simultaneously with the mounting of the change part 401. In this case, the control unit 412 additionally comprises an energy storage unit, which is not shown and which is able to store the energy obtained by means of the piezoelectric crystal 402. This storage unit may be implemented e.g. in the form of rechargeable batteries or in the form of a capacitor. Depending on the amount of energy that can be transmitted from the piezoelectric crystal 402 to the control unit 412 by mounting or demounting the change part 401, also a sleep mode of the control unit 412 may be provided when a storage unit exists, which may supply energy e.g. to an additionally provided passive receiver. This allows an activation of the control unit 412 and the resultant transmission of the identification signal through a suitable request of a reader for the identification signal at an arbitrary moment in time after mounting or demounting of the change part 401.

In this context it should be mentioned that the transmitter unit 413 may be configured as a wireless transmitter unit as well as a contact transmitter. In the first case, the transmitter unit 413 preferably transmits an omnidirectional signal in the form of an electromagnetic wave so as to transmit the identification signal. This makes the evaluation of the identification signal by an operator substantially independent of the respective location, a circumstance which is of advantage especially in the case of change parts that are difficult to access. This mode of transmitting the identification signal is, however, very energy-intensive, since an omnidirectionally emitted electromagnetic signal has to be sufficiently strong at each point in space. To this end, the transmitter unit 413 is preferably attached to the surface of the change part 401, since the identification signal can thus be emitted at least in a half-space above the surface of the change part without having to pass through any material, whereby an absorption and thus reduction of the signal strength is prevented. In this respect, it will be of advantage when a reader is used which is capable of receiving a wireless transmitted identification signal at any time, which means that the reader should in any case be permanently supplied with energy so as to exclude the identification signal being sent but not received.

If the transmitter unit 413 is configured as a contact transmitter, the transmitter unit will essentially comprise a terminal which is adapted to have connected thereto a suitable reader, whereby transmission of the identification signal is initiated. Although this will reduce the flexibility of the identification method described or necessitate direct reading on the change part, a reliable reading of the identification signal can thus be realized, and this will guarantee an unequivocal identification especially in the case of large systems that may absorb a substantial part of a wireless transmitted signal.

Irrespectively of whether the transmitter is configured as a contact transmitter or as a wireless transmitter unit, also the sequence of mounting and demounting of various parts can be monitored with the aid of the identification signals, especially in cases where a plurality of change parts is used in a change-over operation, since the identification signals transmitted, which are configured at least as change part class-specific signals or even as globally unique identifiers, can be associated with an exact moment in time. Likewise, the change-over operation can be monitored in this way and relevant information can be transmitted to the operator of the machine, e.g.

with the aid of a mobile terminal. On the basis of this, also additional information, e.g. warnings or specific courses of action concerning the mounting and demounting of certain change-over parts, may be transmitted to the operator. For example, when two or more change parts A, B, . . . X are to be mounted or demounted, the identification signal may be transmitted, when part A has been mounted, so as to cause the mobile terminal to display specific information concerning the mounting of part B. Furthermore, there is the possibility of documenting and storing an executed change-over operation and/or the sequence of change-over operations.

The invention claimed is:

1. A change part for use in a machine employed in the filling or bottle manufacturing industry comprising: an identification element, which comprises a piezoelectric transmitter having a piezoelectric element, whereby, when the change part is mounted to or demounted from the machine, the piezoelectric element is deformed providing energy to the piezoelectric transmitter to enable a wireless transmission of an identification signal comprising, one of a change part class-specific signal and a globally unique identifier.

2. The change part according to claim 1, wherein the piezoelectric element is a piezoelectric crystal or a piezoelectric ceramic provides the energy required for transmitting the identification signal.

3. The change part according to claim 2, wherein the piezoelectric crystal comprises α-quartz or gallium orthophosphate.

4. The change part according to claim 1, and a protection mechanism prevents activation of the piezoelectric transmitter as long as the change part is attached to the machine.

5. The change part according to claim 1, wherein the piezoelectric element is able to obtain the full amount of energy required for transmitting the identification signal from the mounting and/or demounting of the change part.

6. The change part according to claim 1, wherein the identification element includes an energy storage unit which is able to store partly or fully the energy generated by the piezoelectric element.

7. The change part according to claim 6, wherein the identification element includes a delay mechanism which is able to transmit the identification signal at an arbitrary moment in time.

8. A method of identifying, by use of an identification element, a change part for a machine employed in the filling or bottle manufacturing industry, comprising the steps of:
activating a piezoelectric transmitter comprising a piezoelectric element, when the change part is mounted to or demounted from the machine a deformation of the piezoelectric element provides energy to the piezoelectric transmitter; and transmitting a wireless signal from the piezoelectric transmitter wherein: the signal comprises an identification signal, and
the identification signal comprises one of a change part class-specific signal and a globally unique identifier.

9. The method according to claim 8, wherein the energy required for transmitting the identification signal is provided by a piezoelectric crystal which converts the energy generated during mounting or demounting of the change part.

10. The method according to claim 9, wherein the piezoelectric crystal comprises α-quartz or gallium orthophosphate.

11. The method according to claim 8, wherein activation of the piezoelectric transmitter is prevented by a protection mechanism as long as the change part is mounted in the machine.

12. The method according to claim 8, wherein the energy obtained through the piezoelectric element is stored fully or partly in an energy storage unit.

13. The method according to claim 12, wherein the identification signal is transmitted by means of a delay mechanism, utilizing the energy stored in the energy storage unit, at a moment in time different from the mounting and/or demounting of the change part.

14. The method according to claim 8, wherein the identification signal is transmitted omnidirectionally.

* * * * *